D. LATHROP.
Fly-Traps.
No. 148,372. Patented March 10, 1874.
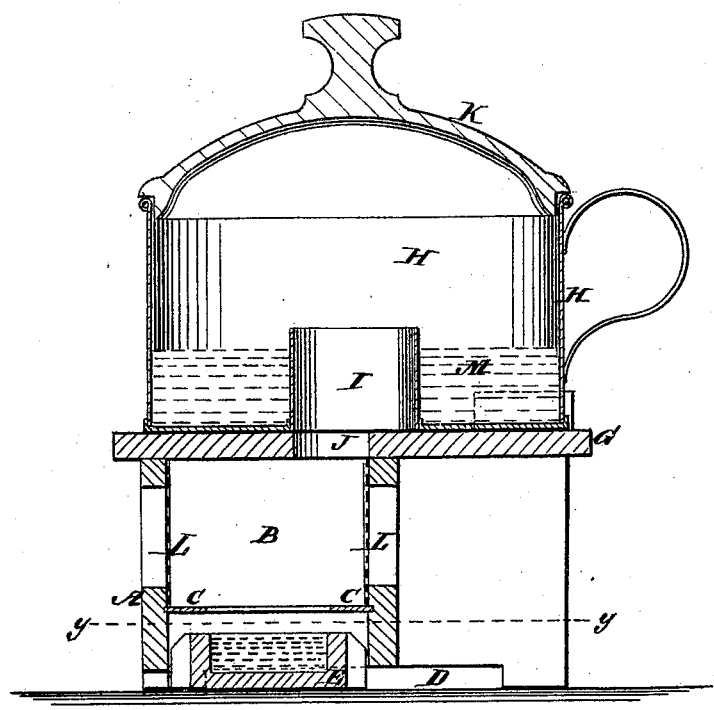
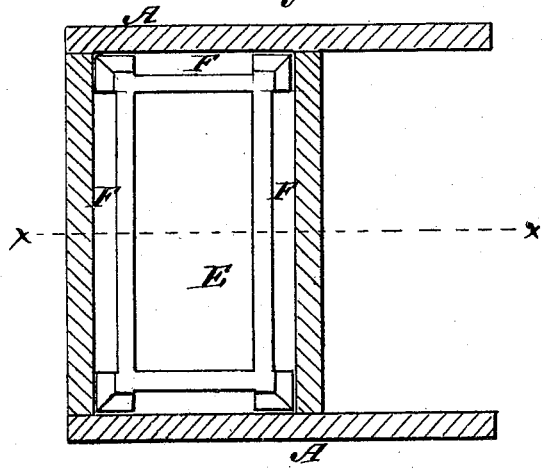
WITNESSES:
INVENTOR:
D. Lathrop
BY
ATTORNEYS.

UNITED STATES PATENT OFFICE.

DIXWELL LATHROP, OF LA SALLE, ILLINOIS.

IMPROVEMENT IN FLY-TRAPS.

Specification forming part of Letters Patent No. 148,372, dated March 10, 1874; application filed February 7, 1874.

*To all whom it may concern:*

Be it known that I, DIXWELL LATHROP, of La Salle, in the county of La Salle and State of Illinois, have invented a new and useful Improvement in Fly-Traps, of which the following is a specification:

This invention relates to the construction of traps for catching and destroying flies and similar insects; and consists in the combination and arrangement of parts hereinafter described.

In the drawing, Figure 1 is a vertical section of the fly-trap, taken on the line $x$ $x$ of Fig. 2. Fig. 2 is a horizontal section taken on the line $y$ $y$ of Fig. 1.

Similar letters of reference indicate corresponding parts.

This fly-trap consists of four separate parts, placed one upon the other, and not necessarily fastened together.

A is the lower casing, made, preferably, of wood, which rests upon table or bench. This casing has an interior compartment, B, which has shelves C around its sides. The bottom edges of the sides of the casing are cut away, except at the corners, leaving spaces D, of about one-fourth of an inch in width, to admit the flies, as seen in Fig. 1. E is the bait-box, which rests upon the table or bench, over which the case A is placed, so that it forms a bottom for the compartment B, with an open space, F, around its sides, as seen in Fig. 2. G is the top of the casing. H is a cup made of any suitable material, having in its center a tube, I, which communicates with the compartment B by means of the aperture J through the top G of the case. K is a glass or transparent cover, which admits light, but closes the cup. The fly-trap, therefore, consists of the bait-box E, the case A, the cup H, and the transparent cover K.

Sweetened water, sirup, or any suitable bait is placed in the bait-box, to which the flies and insects readily find access. The compartment or chamber B is lighted by the wire gauze or glass windows L in its sides, and the flies, instead of returning the way they entered, fly upward, and, finding their escape cut off, and, seeing the full light of day above them, readily pass, through the opening J and tube I, into the cup H against the glass cover, from which they drop into the liquid $m$, in the cup, which kills them.

Having thus described my invention, I claim as new and desire to secure by Letters Patent—

A fly-trap consisting of the bait-box E, bottom case A, having compartment or chamber B, with windows L L, opening J, cup H, with tube I, and transparent cover K, arranged substantially as shown and described.

DIXWELL LATHROP.

Witnesses:
R. D. McDONALD,
O. T. GILLETT.